3,399,075
Patented Aug. 27, 1968

3,399,075
COATING COMPOSITIONS IN NONPOLAR VEHICLES HAVING ADDITIVE FOR ADJUSTING ELECTRICAL PROPERTIES AND METHOD OF USING
Lester L. Spiller, Indianapolis, Ind., assignor to Ransburg Electro-Coating Corp., Indianapolis, Ind., a corporation of Indiana
No Drawing. Filed June 16, 1965, Ser. No. 464,574
14 Claims. (Cl. 117—93.4)

ABSTRACT OF THE DISCLOSURE

An additive is provided whereby the electrical characteristics of coating compositions in non-polar vehicles may be adjusted for electrostatic spraying and particularly electrostatic atomization without the use of polar solvents.

---

The present invention relates to improvements in the electrostatic spraying of paint and other coating compositions and is particularly directed to the provision of new paint compositions to achieve improved electrostatic sprayability. The invention is especially directed to coating compositions in which a film-forming resin component is in solution in an essentially non-polar organic solvent medium, particularly where the solution is devoid of particulate filler or pigment so as to provide clear coatings.

At the present time, electrostatic spraying is carried out by either mechanically atomizing the paint and then depositing the atomized spray particles in an electrostatic field in order to increase the proportion of the spray particles which are deposited upon the object to be coated, or by atomizing under the influence of an electrostatic field and depositing the charged spray particles so produced. The present invention is particularly applicable to this latter system in which, as is well known, a unidirectional electrostatic charge is passed through the solution coating composition in the form of a thin layer or film.

Some paints and coating compositions respond to electrostatic atomization better than others, and considerable effort has been made to extend the electrostatic atomization process to include coating compositions not heretofore sprayable and to improve the spray efficiency of other coating compositions.

I have previously determined that the electrostatic sprayability of coating compositions may be improved in diverse ways. Thus, one may use large proportions of polar solvents, but this is undesirable as is well known. Smaller amounts of polar solvents are effective when the paint system is modified to include complexes which ionize in the presence of the polar solvent to provide large charged particles of limited electrophoretic mobility. However, the presence of a proportion of polar solvent to induce the formation of the large charged particles is still an essential of the system.

In some instances, the presence of polar solvent or particulate components is undesirable as, for example, when a component of the paint is deleteriously affected thereby or when the surface to be coated is sensitive to the polar solvent. To illustrate, daylight fluorescent paints include a pigment component which swells in the presence of polar solvent, losing its light reflecting quality. Wax solutions used to protect the finish on automobiles during transit and which are buffed off prior to sale cannot include a polar solvent, for such polar solvent disturbs the finish on the car. Particulate components tend to disturb the clarity and gloss of clear coatings.

The search for an appropriate modification of the unsprayable or poorly sprayable paint or coating composition is further complicated by the obvious requirement that the quality and color of the paint film and its application cannot be impaired.

In accordance with the present invention, an organic solvent solution of film-forming resin, and preferably a relatively viscous solution in essentially non-polar organic solvent medium, has dissolved therein (1) a small proportion of alkaline earth metal salt, especially the calcium salt, or the aluminum salt of an organic acid, the salt having a molecular weight of at least 200, and (2) a small proportion of a material having a molecular weight of at least 200 and for which the product of the molecular weight times the specific conductivity at 25° C. of a solution of 1 gram thereof in 1 liter of benzene is at least $10^{-10}$, said material having both a different cation and a different anion from those of said salt.

The salt which is used is an alkaline earth metal salt or an aluminum salt, calcium being the preferred alkaline earth.

Various types of organic acids may be used in the formation of the required salt. Examples of suitable acids are substituted aliphatic, cyclo-aliphatic and aromatic monocarboxylic or polycarboxylic acids. Other organic acidic materials may also be used such as phenols and organic sulphonic acids. These various salts are illustrated by calcium oleate, magnesium oleate and aluminum oleate, calcium phenyl stearate, calcium di-isopropyl salicylic acid, and the corresponding salts of aluminum and magnesium in which the propyl substituents may be replaced by longer chain alkyl groups. Salts of alkyl phenol-formaldehyde condensates and of the sulphonated dialkyl esters of aliphatic dicarboxylic acids such as the calcium or aluminum salts of the sulphonated dioctyl ester of succinic acid may be employed. Phenolate salts are also included.

The other material which must be dissolved in the solution may also be, and desirably is, a salt of alkaline earth metal or aluminum with an organic acid, but numerous other materials can be used, especially alkali metal and ammonium salts of organic acids such as the sodium or potassium salt. The same acids referred to with respect to the salt component are useful with the proviso that the salt and the other material are required to have different anions and different cations.

Many further materials having the required molecular weight and conductivity in benzene may be used such as salts of an organic base such as an organic quaternary ammonium salt, or a corresponding quaternary phosphonium salt or a ternary sulphonium salt. Also, the other material may be an organic acid or other organic compound such as sulphones, sulphonamides, polyoxyalkylene oxides such as polypropylene glycol having a molecular weight of 425, phenol-formaldehyde condensation products, alcohols, ethers, esters, oxidized mineral oils, phosphatides and asphaltenes. Some specific useful compounds are illustrated by tetraisoamyl ammonium picrate, ammonium di-isopropyl salicylate, calcium oleate, a petroleum sulphonic acid and the sodium salt thereof, lithium dioctyl sulphosuccinate and cetyl pyridinium bromide. A molecular weight of at least 300 is preferred.

The salt and other material specified hereinbefore are used in small amounts to provide a total of from .0005% to .02%, preferably from .0025% to .008% by weight, based on the weight of the coating composition. Smaller amounts are ineffective to significantly improve electrostatic atomization. Larger amounts are wasteful, tend to injure the paint, and to interfere with the electrostatic spray process. The weight ratio of salt and other material may broadly extend from 1:50 to 50:1, preferably from 1:5 to 5:1, and most preferably from 1:1.5 to 1.5:1. Preferred practice of the invention is represented by the addition of from 5 to 15 cc. of a hydrocarbon solution, e.g., a xylene solution, containing 1% by weight of each of aluminum di-isopropyl salicylic acid and calcium dodecyl sulphosuccinate in solution, to 1 gallon of paint or other coating composition.

The film-forming resin is desirably of low dielectric constant, e.g., a dielectric constant less than 7, and it must be at least largely in solution in the organic solvent medium. Alkyd resins, oil-modified alkyd resins, oil-soluble phenol-formaldehyde condensates, aromatic-soluble copolymers of vinyl chloride and vinylidene chloride, polyoctadecyl methacrylate, polymers and copolymers of vinyl chloride such as 95/5 or 87/13 copolymers of vinyl chloride and vinyl acetate, butylated melamine-formaldehyde condensates, bodied drying oils, such as heat-bodied linseed oil, epoxy ester resins such as tall oil esters with polyglycidyl ethers of bisphenol A having an average molecular weight of about 1000 are all illustrations of film-forming resins which may be used, preferably in maximum concentration consistent with electrostatic atomization. Preferably, the coating composition contains at least 15% by weight of dissolved resin solids and has a #4 Ford Cup viscosity at 25° C. of at least 20 seconds.

The invention is not limited to the specific nature of the organic solvent, though it is preferred to employ essentially non-polar organic solvent mediums. Thus, the preferred solvents are hydrocarbon solvents such as mineral spirits and aromatic hydrocarbons such as benzene, toluene and xylene in the substantial absence of any polar solvent component.

The value of the invention will be particularly apparent in its application to a conventional alkyd base enamel having the following composition:

| | Percent |
|---|---|
| Titanium dioxide anatase | 16.3 |
| Rutile titanium calcium pigment | 19.4 |
| Silicate extender | 10.2 |
| Soya-safflower alkyd resin | 23.7 |
| Xylene | 15.0 |
| Toluene | 15.4 |
| Tinting color added. | |

The soya safflower alkyd resin contains soya oil and safflower oil in a 50/50 weight ratio mixture, the oil component being present in medium length to provide a pure alkyd in which the molar ratio of glycerol to phthalic anhydride is 1.5:1, the resin being provided in a 50% solution in xylol.

When 5–15 cc. of the xylene solution referred to hereinbefore are added to the above alkyd base enamel, good electrostatic sprayability is achieved whereas, if significantly less of the hydrocarbon solution is added, the enamel is poorly sprayable. If the proportion of addition specified herein is significantly exceeded, the enamel tends to discolor, this being especially noted when the coating material is baked.

The invention is defined in the claims which follow.

I claim:
1. A method for electrostatically spraying coating compositions comprising passing a unidirectional electrostatic charge through a layer of an organic solvent solution coating composition, said coating composition comprising film-forming resin dissolved in organic solvent medium, said composition having dissolved therein from .0005 to .02 percent by weight of a mixture of salt and other material in weight proportions of from 1:50 to 50:1, said salt having a molecular weight of at least 200 and being selected from the group consisting of alkaline earth metal and aluminum salts of an organic acid, said other material having a molecular weight of a least 200, the product of the molecular weight of said other material times the specific conductivity thereof at 25° C. in a solution of 1 gram thereof in 1 liter of benzene being at least $10^{-10}$, and said other material having both a different cation and a different anion from those of said salt.

2. A method as recited in claim 1 in which said salt is the calcium salt of an organic acid.

3. A method as recited in claim 1 in which said salt is the aluminum salt of an organic acid.

4. A method as recited in claim 1 in which said film-forming resin has a dielectric constant less than 7 and is present in substantial proportion to provide a #4 Ford Cup solution viscosity at 25° C. of at least 20 seconds.

5. A method as recited in claim 1 in which said organic solvent medium is essentially non-polar.

6. A method as recited in claim 5 in which said organic solvent medium consists essentially of hydrocarbon solvent selected from the group consisting of mineral spirits and mononuclear aromatic hydrocarbon solvents.

7. A method as recited in claim 1 in which said other material is a salt of an organic acid with a cation selected from the group consisting of alkaline earth metal, aluminum, alkali metal, and ammonia.

8. A method as recited in claim 1 in which the weight ratio of said salt to said other material is within the range of from 1:5 to 5:1.

9. A method as recited in claim 1 in which said coating composition is a clear coating composition.

10. A method as recited in claim 1 in which said coating composition comprises a pigment component deleteriously affected by the presence of polar solvent and said organic solvent medium is substantially devoid of any polar solvent component.

11. A coating composition comprising film-forming resin dissolved in organic solvent medium, said composition having dissolved therein from .0025 to .008 percent by weight of a mixture of salt and other material in weight proportions of from 1:50 to 50:1, said salt having a molecular weight of at least 200 and being selected from the group consisting of alkaline earth metal and aluminum salts of an organic acid, said other material having a molecular weight of at least 200, the product of the molecular weight of said other material times the specific conductivity thereof at 25° C. in a solution of 1 gram thereof in 1 liter of benzene being at least $10^{-10}$, and said other material having both a different cation and a different anion from those of said salt.

12. A coating composition as recited in claim 11 in which said film-forming resin has a dielectric constant less than 7 and is present in substantial proportion to provide a #4 Ford Cup solution viscosity at 25° C. of at least 20 seconds, and said organic solvent medium is essentially non-polar.

13. A daylight fluorescent paint comprising film-forming resin dissolved in organic solvent medium, said paint having dissolved therein from .0025 to .008 percent by weight, based on the total weight of said paint, of a mixture of salt and other material in weight proportions of from 1:50 to 50:1, said salt having a molecular weight of at least 200 and being selected from the group consisting of alkaline earth metal and aluminum salts of an organic acid, said other material having a molecular weight of at least 200, the product of the molecular weight of said other material times the specific conductivity thereof at 25° C. in a solution of 1 gram thereof to 1 liter of benzene being at least $10^{-10}$, and said other material having both a different cation and a different anion from those of said salt, said paint further comprising a light-reflective pigment component which swells in the presence of polar solvent, losing its light-reflective quality thereby and said organic solvent medium being substantially devoid of any polar solvent component.

14. A wax solution applicable to polar solvent-sensitive finishes comprising wax dissolved in organic solvent medium, said solution having dissolved therein from .0005 to .02 percent by weight, based on the total weight of said solution, of a mixture of salt and other material in weight proportions of from 1:50 to 50:1, said salt having a molecular weight of at least 200 and being selected from the group consisting of alkaline earth metal and aluminum salts of an organic acid, said other material having a molecular weight of at least 200, the product of the molecular weight of said other material times the specific conductivity thereof at 25° C. in a solution of 1 gram thereof in 1 liter of benzene being at least $10^{-10}$, and said other material having both a different cation and a different anion from those of said salt, said organic solvent medium being substantially devoid of any polar solvent component.

References Cited
UNITED STATES PATENTS

| | | | |
|---|---|---|---|
| 3,112,216 | 11/1963 | Spiller | 260—22 XR |
| 3,112,217 | 11/1963 | Spiller | 268—22 XR |
| 3,112,218 | 11/1963 | Spiller | 260—22 XR |
| 3,117,029 | 1/1964 | Hines | 117—93.4 XR |
| 3,260,616 | 7/1966 | Brewer | 117—93.4 |

ALFRED L. LEAVITT, *Primary Examiner.*

J. H. NEWSOME, *Assistant Examiner.*